US009467473B2

(12) United States Patent
Jayaraman et al.

(10) Patent No.: US 9,467,473 B2
(45) Date of Patent: Oct. 11, 2016

(54) SYSTEM AND METHOD FOR COMPACT FORM EXHAUSTIVE ANALYSIS OF SECURITY POLICIES

(71) Applicant: Microsoft Corporation, Redmond, WA (US)

(72) Inventors: Karthick Jayaraman, Kirkland, WA (US); Charles W. Kaufman, Redmond, WA (US); Nikolaj S. Bjorner, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 14/032,051

(22) Filed: Sep. 19, 2013

(65) Prior Publication Data

US 2015/0082370 A1    Mar. 19, 2015

(51) Int. Cl.
*H04L 29/00* (2006.01)
*H04L 29/06* (2006.01)

(52) U.S. Cl.
CPC .................................. *H04L 63/20* (2013.01)

(58) Field of Classification Search
CPC ....................................................... H04L 63/20
See application file for complete search history.

(56) References Cited

U.S. PATENT DOCUMENTS

| 2005/0038881 | A1* | 2/2005 | Ben-Itzhak | G06F 21/55 709/223 |
| 2007/0074152 | A1* | 3/2007 | Roe | G06F 17/504 717/104 |
| 2008/0301765 | A1 | 12/2008 | Nicol et al. | |
| 2010/0192129 | A1* | 7/2010 | Langworthy | G06F 8/437 717/126 |
| 2012/0331115 | A1* | 12/2012 | Narain | H04L 41/0813 709/220 |
| 2014/0067897 | A1* | 3/2014 | Case | G06F 17/504 708/625 |

FOREIGN PATENT DOCUMENTS

EP          2023567 A1    2/2009

OTHER PUBLICATIONS

Youssef, Nihel Ben et al., "Automatic Verification of Conformance of Firewall Configurations to Security Policies", IEEE 2009, pp. 526-531.*
Veanes, Margus et al., "Solving extended regular constraints symbolically", Technical report, MSR, Dec. 2009, pp. 1-11.*
Vangue, Julien et al., "SMT Solvers for Software Security", Proceedings of the 6th USENIX conference on Offensive Technologies, Aug. 6-7, 2012, pp. 1-12.*
Rezvani, et al., "Specification, Analysis and Resolution of Anomalies in Firewall Security Policies", In World Applied Sciences Journal, vol. 7, Jun. 20, 2010, 11 pages.
(Continued)

*Primary Examiner* — Michael Pyzocha
(74) *Attorney, Agent, or Firm* — Ben Tabor; Micky Minhas

(57) ABSTRACT

A system is described that analyzes and validates network security policies associated with network devices. The system includes a compiler and a security policy analysis and validation tool. The compiler encodes a security policy associated with a network device into a predicate expressed in bit-vector logic and generates a bit-vector formula based on the predicate. The tool receives the bit-vector formula and applies a Satisfiability Modulo Theories (SMT) solver thereto to identify and enumerate solutions to the bit-vector formula. The enumerated solutions provide information about the validity of the first security policy. The solutions may be compactly enumerated in a as product of intervals or a product of unions of intervals.

17 Claims, 7 Drawing Sheets

(56) References Cited

OTHER PUBLICATIONS

Yuan, et al., "Fireman: A Toolkit for FIREwall Modeling and Analysis", In IEEE Symposium on Security and Privacy, May 21, 2006, 15 pages.

Thanasegaran, et al., "A Topological Approach to Detect Conflicts in Firewall Policies", In IEEE International Symposium on Parallel & Distributed Processing, May 23, 2009, 7 pages.

Al-Shaer, et al., "Discovery of Policy Anomalies in Distributed Firewalls", In Twenty-third Annual Joint Conference of the IEEE Computer and Communications Societies, vol. 4, Mar. 7, 2004, 12 pages.

Cuppens, et al., "Detection and Removal of Firewall Misconfiguration", In Proceedings of the IASTED International Conference on Communication, Network, and Information Security, vol. 1, Nov. 14, 2005, 8 pages.

Bourdier, Tony, "Symbolic Analysis of Network Security Policies Using Rewrite Systems", Published on: Feb. 2011, Available at: http://hal.archives-ouvertes.fr/docs/00/56/78/58/PDF/hal.pdf.

Bandara, et al., "Using Argumentation Logic for Firewall Configuration Management", In Proceedings of the 11th IFIP/IEEE International Conference on Symposium on Integrated Network Management, Jun. 1, 2009, 8 pages.

Martinsen, Pal-Erik, "Configuration and Implementation Issues for a Firewall System Running on a Mobile Handset", A Thesis Submitted in Partial Fulfillment of the Requirement for the Degree of Master of Information Technology, Dec. 3, 2008, 130 pages.

\* cited by examiner

| | | | | |
|---|---|---|---|---|
| 1 | remark Isolating private addresses | | 1 | remark Isolating private addresses |
| 2 | deny ip 0.0.0.0/32 any | | 2 | deny ip 0.0.0.0/32 any |
| 3 | deny ip 10.0.0.0/8 any | | 3 | deny ip 10.0.0.0/8 any |
| 4 | deny ip 172.16.0.0/12 any | | 4 | deny ip 172.16.0.0/12 any |
| 5 | deny ip 192.0.2.0/24 any | | 5 | deny ip 192.0.2.0/24 any |
| 6 | ... | | 6 | ... |
| 7 | remark Anti spoofing ACLs | | 7 | remark Anti Spoofing ACLs |
| 8 | deny ip 128.30.0.0/15 any | | 8 | deny ip 128.30.0.0/15 any |
| 9 | deny ip 171.64.0.0/15 any | | 9 | deny ip 171.64.0.0/18 any |
| 10 | ... | | 10 | ... |
| 11 | remark permits for IPs without | | 11 | remark permits for IPs without |
| 12 | port and protocol blocks | | 12 | port and protocol blocks |
| 13 | permit ip any 171.64.64.0/20 | | 13 | permit ip any 171.64.64.0/18 |
| 14 | ... | | 14 | ... |
| 15 | remark standard port and protocol | | 15 | remark standard port and protocol |
| 16 | blocks | | 16 | blocks |
| 17 | deny tcp any any eq 445 | | 17 | deny tcp any any eq 445 |
| 18 | deny udp any any eq 445 | | 18 | deny udp any any eq 445 |
| 19 | deny tcp any any eq 593 | | 19 | deny tcp any any eq 593 |
| 20 | deny udp any any eq 593 | | 20 | deny udp any any eq 593 |
| 21 | ... | | 21 | ... |
| 22 | deny 53 any any | | 22 | deny 53 any any |
| 23 | deny 55 any any | | 23 | deny 55 any any |
| 24 | ... | | 24 | ... |
| 25 | remark permits for IPs with | | 25 | remark permits for IPs with |
| 26 | port and protocol blocks | | 26 | port and protocol blocks |
| 27 | permit ip any 128.30.0.0/15 | | 27 | permit ip any 128.30.0.0/15 |
| 28 | permit ip any 171.64.0.0/15 | | 28 | permit ip any 171.64.64.0/15 |
| 29 | ... | | 29 | permit ip any 128.230.0.0/16 |
| | | | 30 | ... |

FIG. 1

| | | | | |
|---|---|---|---|---|
| 1 | permit ip any PublicIPaddresses | | 1 | permit ip any PublicIPaddresses |
| 2 | permit ip any TenantIPaddresses | | 2 | permit ip any TenantIPaddresses |
| 3 | ... | | 3 | permit tcp any any eq 20002 |
| | | | 4 | ... |

FIG. 2

| Status | Source Address | Src Port | Destination Address | Dst Port | Protocol |
|---|---|---|---|---|---|
| Allow | 10.20.0.0/19 | ★ | 157.55.252.0/22 | ★ | 6 |
| Allow | 10.20.0.0/19 | ★ | 157.55.252.0/22 | ★ | 17 |
| Allow | 10.20.0.0/19 | ★ | 157.55.252.0/22 | ★ | 4 |
| Allow | 10.20.0.0/19 | ★ | 157.55.252.0/22 | ★ | 1 |
| Deny | ★ | ★ | 65.52.244.0/22 | ★ | 4 |

FIG. 3

| Status | Source Address | Src Port | Destination Address | Dst Port | Protocol |
|---|---|---|---|---|---|
| Allow | 10.20.0.0/19 | ★ | 157.55.252.0/30 | ★ | 6 |
| Deny | ★ | ★ | 65.52.244.0/27 | ★ | 4 |

FIG. 4

SYSTEM AND METHOD FOR COMPACT FORM EXHAUSTIVE ANALYSIS OF SECURITY POLICIES

BACKGROUND

With the rapid growth of cloud-based services, the complexity and monetary importance of managing the security of large scale data centers has become a challenge that can no longer rely solely on human inspection and trial and error. To help illustrate this point, a conventional platform that provides large scale public cloud-based services will now be described. The platform provides on-demand computing, storage, and networking resources to mutually distrusting customers. Infrastructure services and customer services provided by the platform are hosted in custom isolation boundaries using network connectivity restrictions. For example, platform management service interfaces are walled off from the Internet and arbitrary customer access. In addition, customer services are also isolated from one another. These restrictions are enforced in network devices such as routers and top-of-rack switches, hypervisor packet filters, and firewalls.

Errors in the enforcement of these restrictions may compromise the security and availability of the platform. For example, an error in the ingress filtering access control list (ACL) for traffic coming from the Internet can cause a connectivity outage to customers. Another potential problem is that management ports on routers and other critical infrastructure may be exposed as a result of configuring overly permissive rules when intending to open the ports only for selected services. If a management service is exposed to the Internet, then it becomes an attractive target for zero-day and distributed denial of service (DDoS) attacks. The opposite problem of accidentally blocking useful ports, such as the User Datagram Protocol (UDP) port for Domain Name System (DNS), is equally possible when blanket policies are added that block traffic.

The frequency with which the network connectivity restrictions are changed adds an important dimension to the problem. Some of these settings may be updated dynamically. For example, whenever a virtual machine (VM) is instantiated or moved from one host to another, a hypervisor or virtual machine manager (VMM) may dynamically configure the appropriate packet filters for the VM. Additionally, administrators may frequently perform out-of-band updates to the network connectivity restrictions for debugging connectivity issues or in situations such as disaster recovery. The complexity of managing many different address ranges that represent different services adds a further dimension of complexity to the problem. In summary, these network connectivity restrictions are subject to change in many ways, and the access requirements can interact in several ways. As a result, manual inspection and maintenance of network connectivity restrictions is not a viable option. Instead, automated validation methods are needed that can be used to ensure that that the intended network connectivity model is always preserved with respect to both security and availability.

SUMMARY

A system is described herein for analyzing and validating network security policies associated with network devices. Such security policies may comprise sets of rules that filter Internet Protocol (IP) packets and the network devices may comprise firewalls, routers, hypervisor packet filters or switches. The system includes a compiler and a security policy analysis and validation tool. The compiler encodes a first security policy associated with a network device into a predicate expressed in bit-vector logic and generates a bit-vector formula based on the predicate. The tool receives the bit-vector formula and applies a Satisfiability Modulo Theories (SMT) solver thereto to identify and enumerate solutions to the bit-vector formula. The enumerated solutions provide information about the validity of the first security policy.

In one embodiment, the compiler generates the bit-vector formula by combining the predicate with another predicate that represents a second security policy. In accordance with such an embodiment, the solutions to the bit-vector formula represent differences between the first security policy and the second security policy.

In another embodiment, the compiler generates the bit-vector formula by combining the predicate with a bit-vector logic representation of a contract, the contract describing a set of traffic patterns that should be allowed or denied by the first security policy. In accordance with such an embodiment, the solutions to the bit-vector formula indicate whether the contract is preserved by the first security policy.

The foregoing system may further include a monitoring node that periodically obtains security policies from network devices, including the first security policy associated with the network device.

In another embodiment, the first security policy comprises a configuration file. In further accordance with such an embodiment, the compiler may include a parser that is configured to extract information from the configuration file that is used to encode the first security policy into the predicate expressed in bit-vector logic.

In yet another embodiment, the security policy analysis and validation tool identifies solutions to the bit-vector formula by identifying tuples that satisfy the bit-vector formula, each tuple including one or more of a source IP address, a destination IP address, a source port, and destination port.

Depending upon the implementation, the security policy analysis and validation tool may enumerate the solutions to the bit-vector formulas as cubes or multi-cubes. A cube represents a cross product of intervals. A multi-cube represents a cross product of unions of intervals.

The system may be implemented in an analysis server that comprises a part of a network monitoring system. The system may also be implemented as a command line tool in a device management server.

A method for compactly enumerating solutions to a bit-vector formula is also described herein. In accordance with the method, a set of values that satisfy the bit-vector formula is identified. The set of values is then expanded to a set of intervals that satisfy the bit-vector formula. The expansion process includes identifying for each interval a maximum lower bound and a maximum higher bound. The identification of the maximum lower bound includes identifying values below the maximum lower bound for which the complement of the bit-vector formula is satisfied. The identification of the maximum higher bound includes identifying values above the maximum upper bound for which the complement of the bit vector formula is satisfied. Once the set of intervals has been obtained in this fashion, the set of intervals is utilized to enumerate solutions to the bit-vector formula.

In one embodiment, utilizing the set of intervals to enumerate solutions to the bit-vector formula comprises enumerating solutions to the bit-vector formula as a product of the intervals.

In an alternate embodiment, utilizing the set of intervals to enumerate solutions to the bit-vector formula includes inserting new values into the set of intervals thereby generating a set of unions of intervals, and enumerating solutions to the bit-vector formula as a product of the unions of intervals.

A computer program product is also described herein. The computer program product comprises a computer readable storage device having computer program logic stored thereon. The computer program logic includes first computer program logic, second computer program logic and third computer program logic. When executed by a processing unit, the first computer program logic encodes a first security policy associated with a network device (e.g., a firewall, a router, a hypervisor packet filter, or a switch) into a predicate expressed in bit-vector logic and generates a bit-vector formula based on the predicate. When executed by the processing unit, the second computer program logic applies a SMT solver to the bit-vector formula to identify solutions thereto, the solutions to the bit-vector formula providing information about the validity of the first security policy. When executed by the processing unit, the third computer program logic enumerates the solutions to the bit-vector formulas as multi-cubes, each multi-cube representing a cross product of unions of intervals.

In an embodiment, the first computer program logic generates the bit-vector formula by combining the predicate with another predicate that represents a second security policy. In accordance with such an embodiment, the solutions to the bit-vector formula represent differences between the first security policy and the second security policy.

In another embodiment, the first computer program logic generates the bit-vector formula by combining the predicate with a bit-vector logic representation of a contract, the contract describing a set of traffic patterns that should be allowed or denied by the first security policy. In accordance with such an embodiment, the solutions to the bit-vector formula indicate whether the contract is preserved by the first security policy.

In yet another embodiment, the second computer program logic identifies solutions to the bit-vector formula by identifying tuples that satisfy the bit-vector formula, each tuple including one or more of a source IP address, a destination IP address, a source port and a destination port.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 1 depicts a canonical example of an ACL utilized by an Edge router and typical maintenance operations done on it.

FIG. 2 depicts an example of an outbound-side hypervisor packet filter ACL before and after an update has been applied thereto.

FIG. 3 depicts a sample security policy, which is described as a set of rules that filter Internet Protocol (IP) packets.

FIG. 4 depicts two example contracts, wherein each contract describes a set of network traffic patterns that should be allowed or denied by a security policy.

Figure 5:
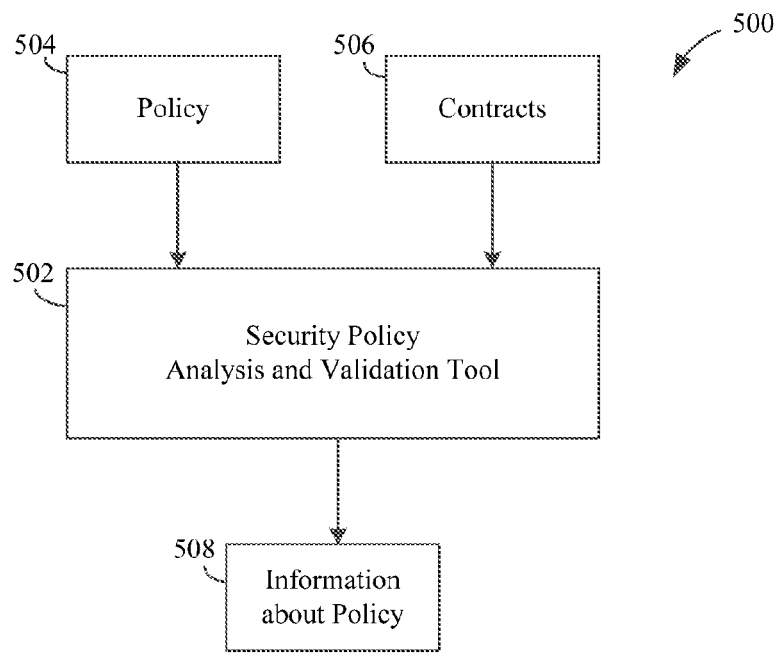
FIG. 5 is a block diagram showing the high-level architecture of an automated security policy analysis and validation system operating in a contract validation mode in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems and methods are described herein that analyze network security policies in an automated fashion using tools for solving logical formulas. In accordance with certain implementations, firewall, router and other device configurations are converted into the logic of bit-vectors, thereby enabling queries to be represented over the configurations. Such queries are then solved using symbolic methods for bit-vectors. The approach described herein is general and scalable for security policy analysis and management.

Systems and methods described herein also automatically identify and enumerate configuration mismatches between security policies in exhaustive and compact form. By producing compact form enumerations of configuration mismatches, embodiments described herein can significantly simplify the process of fixing policies and identifying root causes. In certain embodiments, the systems and methods are applied to firewall and router policies that are expressed as filters on network packet headers. In further accordance with such embodiments, these filters are re-formulated as logical formulas using a compact representation known as the logic of bit-vectors. Logical formulas representing policies are then combined into complex logical formulas that describe relations between policies or queries on a policy.

Further embodiments described herein utilize a method for enumerating solutions to combinations of logical formulas corresponding to bit-vectors. The method produces an enumeration of solutions in a format that applies directly to the context of security policy analysis. In particular, the method produces an enumeration of solutions in compact form by representing enumerations as a product of unions of intervals (referred to herein as "multi-cubes"). Multi-cubes can be used to enumerate an exponential number of solutions compactly without explicitly visiting each solution. This representation generalizes enumerating one solution at a time, and it generalizes enumerating simple products of intervals (cubes). Due to its generality, the method may be applied irrespective of how policies are combined into complex formulas.

Section II below describes some of the motivations for developing the automated security policy analysis and validation systems and methods described herein. Section III describes an example architecture of an automated security policy analysis and validation system, as well as various data center implementations thereof. Section IV describes the manner in which security policies are encoded as bit-vector logic. Section V describes algorithms for enumerating differences between policies. Section VI describes various methods that may be implemented by an automated security policy analysis and validation system as described herein. Section VII describes an example computer system that may be used to implement embodiments described herein. Section VIII provides come concluding remarks.

II. Motivations for Automated Security Policy Analysis and Validation

A public cloud-based services provider may enforce a number of network connectivity restrictions using a combination of in-network ACLs, hypervisor packet filter rules, and host firewalls. Typically, the objectives of enforcing such network connectivity restrictions include:

(1) Isolating private networks: In an example data center, all host machines have a private IP address following RFC 1918 guidelines. These addresses are walled off from the Internet and are primarily used for internal endpoints. In addition, private IP addresses of guest virtual machines (VMs) should be accessible only to other guest VMs that have the same tenancy.

(2) Protecting management interfaces: Management service interfaces and particularly services that have access to customer data should be reachable only to a whitelist of trusted clients. Although these services may always use two-way Secure Sockets Layer (SSL) channels and two-factor authentication, the reachability isolation in the network can provide a first level of defense. Moreover, it also makes the service resilient to client-side cryptographic key compromise. In such cases, the service could continue to operate securely based solely on reachability isolation, thereby providing the agility to recover from such failures. Finally, if these restrictions are enforced upstream in the network, then they can also provide resilience against DDoS attacks.

(3) Anti-spoofing: Anti-spoofing restrictions can provide a high degree of confidence that traffic inside the data center is not spoofed. This may be enforced in multiple devices. For example, network devices connecting the Internet and the data center, referred to as Edge devices, may perform ingress filtering to drop traffic coming from the Internet and having a source address belonging to the data center network. In additional, a hypervisor packet filter may prohibit a guest VM from forging its source IP address. Together these restrictions can help to limit the scale and extend of DDoS attacks.

Maintaining the correctness and consistency of these network connectivity restrictions can be challenging for a number of reasons. First, a public cloud-based services provider may have several thousands of networking devices, wherein each of these devices is required to enforce the correct set of restrictions. Second, the various types of devices may be subject to a varying frequency of both regular and out-of-band maintenance operations. For example, it may be required that VMs be instantiated with correct settings the first time they are created, and that the policies be updated dynamically as the VMs are being moved, due to fresh deployments or hardware failures. Furthermore, debugging and maintenance operations may require out-of-band changes to the settings. Third, some services may need standard restrictions and others may need exceptions. Finally, some enforcements may depend on the correctness of others, such that the composition of these enforcements delivers the desired security properties.

The challenges of maintaining the correctness and consistency of such network connectivity restrictions will now be further illustrated using two representative examples—namely an Edge network ACL and hypervisor packet filter rules. These examples are provided herein for the purposes of illustration only, and it will be appreciated by persons skilled in the art that a wide variety of other types of network connectivity restrictions may be analyzed and validated by embodiments described herein.

A. The Edge ACL

Large data centers commonly use a set of routers to connect the data center networks to the Internet backbone. These routers may be referred to as the Edge routers and the ACL enforced in them may be called the Edge ACL. FIG. 1 provides a canonical example of an Edge ACL and typical maintenance operations done on it. The ACL is authored in the IOS® language, published by Cisco Systems, Inc. of San Jose, Calif. Each rule describes a traffic expression in terms of five parameters—namely, source address, source port, destination address, destination port, and protocol—and defines whether the packet matching this pattern should be accepted or denied. This language has first-applicable rule semantics, where the device processes an incoming packet per the first rule that matches the description. If no rules match, then the incoming packet is denied by default.

In FIG. 1, IP address ranges are represented in the Classless Inter-Domain Routing (CIDR) format. CIDR specifies an IP address range using a combination of an IP address and its associated network mask. CIDR notation uses the following format:

xxx.xxx.xxx.xxx/n where n is the number of (leftmost) '1' bits in the mask. For example, 192.168.12.0/23 applies the network mask 255.255.254.0 to the 192.168 network, starting at 192.168.12.0. This notation represents the address range 192.168.12.0-192.168.13.255.

The left hand side of FIG. 1 shows an ACL instance, and has four sections. The first section (lines 2-6) of the ACL filters Internet traffic that targets private data center IP addresses. For example, line 3 in the ACL denies traffic targeting IP addresses in 10.0.0.0/8, which is a private address range per RFC 1918 and should not be reachable from the Internet. The second section (lines 8-10) of the ACL is for anti-spoofing and filters Internet traffic that claims to come from the data center network. The third section (lines 13-14) of the ACL permits traffic targeting data center IP addresses that should not have any port blocks. The fourth section (lines 17-24) of the ACL blocks a standard set of ports and protocols on all Internet traffic targeting any destination inside the data center network. Finally, the fifth section (lines 27-29) of the ACL permits traffic targeting data center IP addresses that has been subject to the port and protocol restrictions of the fourth section of the ACL. This is because of the rule ordering. Any traffic targeting blocked ports and protocols on the IP addresses in the fifth section will first match the rules in the fourth section and will therefore be denied. The last three section of the ACL exist because the example network is shared between hosts that want to expose only selected ports and those that want to expose them all.

The ACL instance shown on the right-hand side of FIG. 1 highlights examples of typical maintenance updates that may be applied to the Edge ACL. In line 9, the update changes the address range in the anti-spoofing ACL from 171.64.0.0/15 to 171.64.0.0/18. This is because address ranges 171.64.64.0/18 and 171.64.128.0/17 are assigned to networks that interconnect with the Edge over the Internet. Therefore, the anti-spoofing ACL had to be revised to exclude those addresses. In line 12, the update changes the IP range without port and protocol blocks from 171.64.64.0/20 to 171.64.64.0/18. Finally, in line 29, the update adds permits for a new block of IP addresses. These addresses do not have corresponding anti-spoofing ACLs because they are assigned to networks that connect to the Edge over the Internet.

Each of the updates described in this example appear amenable to manual inspection. However, in practice the scale of both the ACL and maintenance operations make manual inspection impossible. In a conventional large-scale cloud-based service platform, the size of the ACL is typically several hundreds of lines (determined by the number of IP addresses owned by the platform). Furthermore, the Edge network typically has a large number of Edge routers. Finally, the ordered interpretation of this ACL makes verification more cumbersome.

The rapid growth of capacity and provisioning of new services introduces a corresponding churn in IP addresses and updates to the Edge ACL. To preserve the security and functionality of the Edge ACL, it is critically important to ensure that updates to the Edge ACL do not violate the intended connectivity model. For example, an incorrect update that omits a rule that allows traffic targeting an IP address range in the platform's data center could cause a massive connectivity outage. Similarly, an incorrect update that omits a rule for filtering traffic targeting private IP addresses can expose data center private addresses.

B. Hypervisor Packet Filter ACL

FIG. 2 depicts an example of a hypervisor packet filter ACL. This ACL is enforced by a packet filter at the hypervisor level and is typically used to create a virtual overlay network to isolate guest VMs from data center private assets. For example, FIG. 2 shows an example of a hypervisor packet filter ACL on the outbound side. The left-hand side shows an instance of the ACL and the right-hand side shows the instance of the ACL after an update has been applied thereto. For the sake of expediency, only an excerpt of the ACL is shown and symbolic names are used in the place of IP addresses. In contrast to the Edge ACL, which has first-applicable rule semantics, this ACL has default-deny semantics. In accordance with default-deny semantics, a packet is allowed if and only if it is allowed by any one of the permit rules and not denied by any of the deny rules.

Line 1 of the hypervisor packet filter ACL shown on the left-hand side of FIG. 2 allows the guest VM to communicate with any IP address that is in the public IP address range. Line 2 permits a guest VM to connect to any other VM that has the same tenancy. Implicit in the semantics is the fact that a guest VM cannot connect to any of the data center private assets such as power-strips, digis, and management IPs. These rules may be created each time a VM is instantiated and may also be updated dynamically as VMs are moved due to customers updating their deployments, hardware failures, or the like. It is of critical importance to ensure that none of the changes violate security intent.

The ACL instance shown on the right-hand side of FIG. 2 is an example of an incorrect update to a hypervisor packet filter rule. A common problem in designating firewall rules is designing a rule that is more permissive than necessary. In this case, the highlighted rule was designed to allow a guest VM to access an infrastructure service on a specific port—20002. However, the actual rule specifies "any" for the destination address instead of the specific IP address of the infrastructure service. As a result, a guest VM can now access data center private addresses on port 20002 after the update, and violate the data center security policy.

Both the Edge ACL and the hypervisor packet filter ACL described above highlight the need for an automated and precise method for validating the correctness and consistency of ACL settings. This need can be divided into two requirements. First, given a set of traffic patterns, a method is needed for evaluating whether such traffic patterns are permitted or denied per the ACL. This feature is useful for performing pre-checks on ACLs prior to deployment and for continuous validation. Second, given two ACLs, wherein the second ACL is an updated version of the first ACL, a method is needed for precisely enumerating the drift between the two ACLs. This feature is essential to understand the impact of the update prior to making a change and fixing errors in them, if any.

III. Example Architecture of Security Policy Analysis and Validation System

A system will now be described that automatically analyzes the correctness and consistency of network connectivity restriction policies. The policies are described as a set of rules that filter IP packets. A policy is enforced by inspecting header information of the IP packets and then applying the rules to such information to determine whether the packets may pass through a device, such as a router or a firewall.

FIG. 3 depicts an example policy. Each rule of a policy contains a packet filter, and typically comprises two portions—namely, a traffic expression and an action. The traffic expression specifies a range of source and destination IP addresses, ports, and a protocol specifier. The expression 10.20.0.0/19 specifies an address range $10.2^{24}+20.2^{16}$ to $10.2^{24}+20.2^{16}+20.2^{13}-1$. That is, the first 19 bits are fixed and the remaining 13 (=32-19) are varying. A wild card is indicated by a star. For ports, the wild card encodes the range from 0 to $2^{16}-1$. Rules are further compressed by using multiple ranges for the IP addresses and ports. For example, a filter on an IP address may contain two ranges 10.20.0.0/19; 10.40.0.0/19 where a semi-colon has been used to separate the two ranges. A rule may be said to use a multi-cube if it combines several ranges in this way, otherwise, a rule represents a single cube. The action is either Allow or Deny. Such actions indicate whether packets matching the range should be allowed through the firewall or not.

Figure 6:
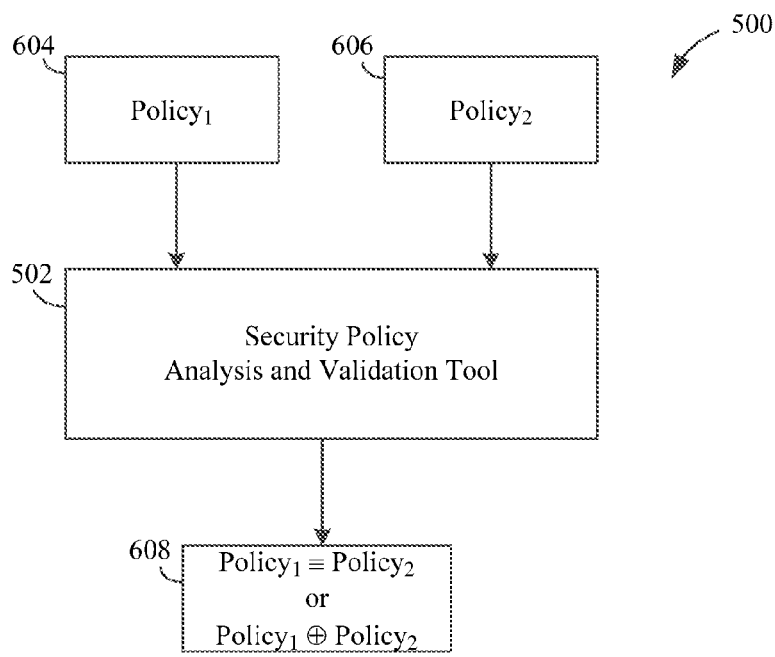
FIG. 6 is a block diagram showing the high-level architecture of an automated security policy analysis and validation system operating in a change-impact analysis mode in accordance with an embodiment.

FIGS. 5 and 6 are block diagrams showing the high-level architecture of an automated security policy analysis and validation system 500 in accordance with an embodiment. In one implementation, the system has two modes of operation—namely, a contract validation mode and a change-impact analysis mode. FIG. 5 depicts system 500 operating in the contract validation mode. FIG. 6 depicts system 500 operating in the change-impact analysis mode.

As shown in FIGS. 5 and 6, system 500 includes a security policy analysis and validation tool 502. In one embodiment, tool 502 is implemented using Z3, a Satisfiability Modulo Theories (SMT) solver developed by Microsoft Corporation of Redmond, Wash. In accordance with such an embodiment, tool 502 may advantageously utilize bit-vector theory support that is provided by Z3. However, this example is not intended to be limiting, and it is to be understood that tool 502 may be implemented using any of a wide variety of publicly-available or proprietary SMT solvers.

The security policy analysis and validation techniques utilized by system 500 are premised on the insight that the security policies utilized by firewalls and routers policies are essentially a set of constraints over IP addresses, ports, and protocol, each of which can be expressed as bit-vectors of varying sizes. Consequently, analysis questions concerning these policies can be expressed as bit-vector logic formulas. In system 500, then, policies and queries are represented as logical formulas.

A. Example Operational Modes

The two aforementioned operational modes of system 500 will now be further described.

1. Contract Validation

For the purposes of this description, the term "contract" refers to a property that should be preserved by a policy. A contract basically describes a set of traffic patterns that should be allowed or denied by the policy. For example, FIG. 4 depicts two example contracts. The first contract describes a traffic pattern that should be accepted by the policy, and the second contract describes a traffic pattern that should be denied by the policy.

In the contract validation mode depicted in FIG. 5, tool 500 accepts a policy 504 and a contract 506 as input and generates information about policy 504 as output 508. Policy 504 may be represented as P and contract 506 may be represented as C. In this case, one of the following results may be generated as output 508:

1. C→P: The contract is preserved by the policy, i.e., the set of all traffic patterns described by C is a subset of the set of all traffic patterns accepted by P.

2. C→¬P: The contract is not preserved by the policy, i.e., the set of all traffic patterns accepted by C is denied by P.

3. C∧P: A proper subset of traffic patterns described in C is contained in the policy P.

The contract validation mode can also be used as a mechanism to query the policy for information. When the response is (1) or (2), tool 502 may be additionally instructed to provide a listing of the specific rules that contributed to the decision. This may be useful for debugging problems with the policy. When the response is (3), tool 502 may provide a compressed representation of this set.

2. Change Impact Analysis

A common policy analysis scenario in a large-scale cloud-based services platform is ascertaining the impact of changes to a policy. In other words, given a policy $Policy_1$ and a policy $Policy_2$, what is the impact of changing from policy $Policy_1$ to policy $Policy_2$? In the change-impact analysis mode, tool 502 accepts a policy $Policy_1$ (having reference numeral 604 in FIG. 6) and a policy $Policy_2$ (having reference numeral 606 in FIG. 6) as input and provides output 608 comprising one of the following results:

1. $Policy_1 \equiv Policy_2$: Both $Policy_1$ and $Policy_2$ accept the same set of traffic patterns and reject the same set of traffic patterns.

2. $Policy_1 \neq Policy_2$: $Policy_1$ and $Policy_2$ differ in the set of traffic patterns that they accept and reject. In addition, tool 502 may also provide the following summary: (a) $Policy_1 \wedge \neg Policy_2$: set of traffic patterns accepted by $Policy_1$ but rejected by $Policy_2$; and (b) $\neg Policy_1 \wedge Policy_2$: set of traffic patterns rejected by $P_1$ but accepted by $P_2$.

This mode essentially provides a semantic difference between the two policies, and can be used for evaluating changes to the policy and also for ascertaining how a policy has drifted away from the actual.

Common to both modes is a uniform encoding of policies and queries into a logical formula. Tool 502 uses satisfiability checking of the resulting logical formula to provide the detailed feedback. More detail concerning how policies and queries are encoded into bit-vector logic and how semantic differences are enumerated succinctly will be provided herein.

B. Example Data Center Implementations

Figure 7:
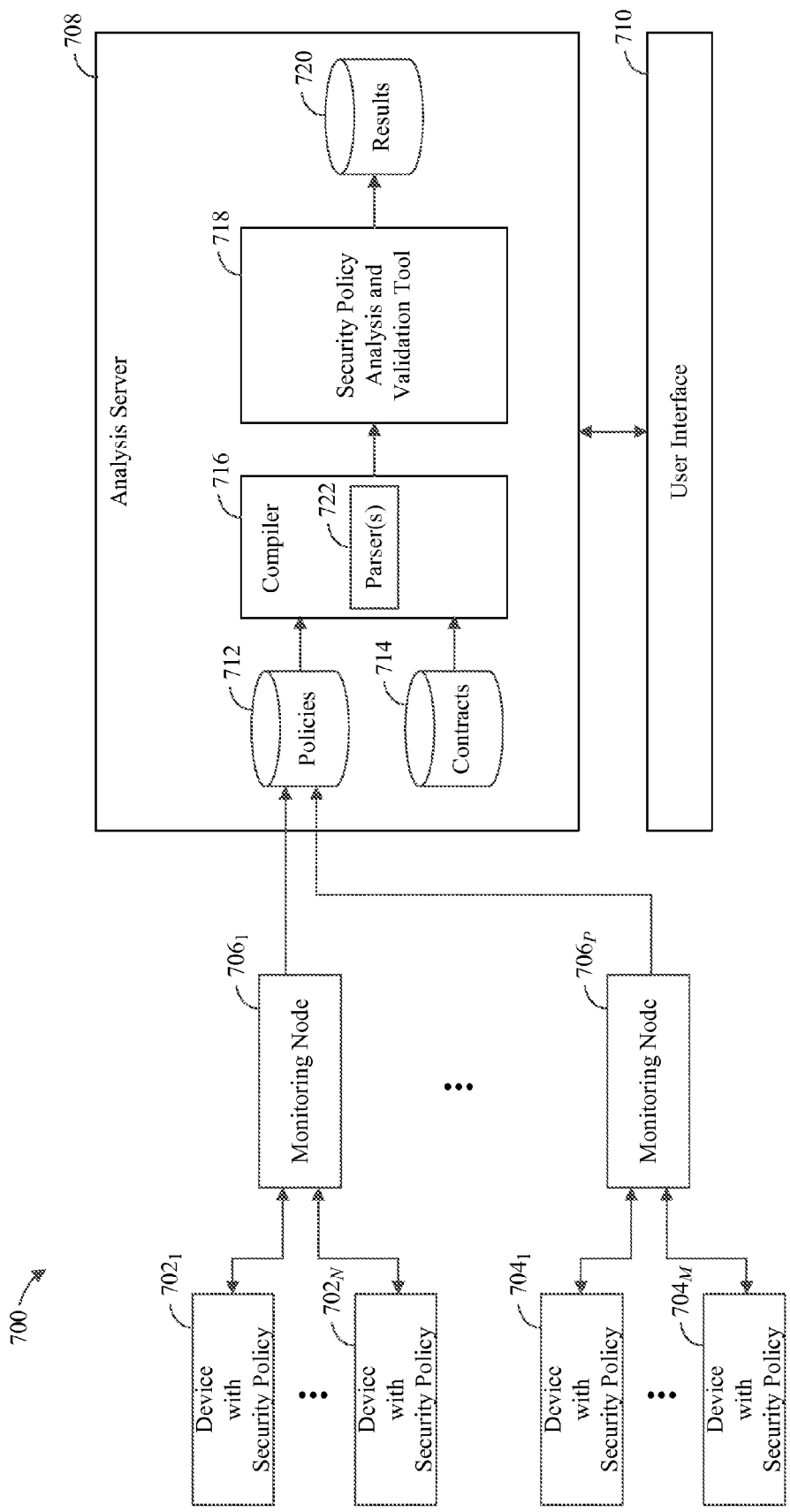
FIG. 7 is a block diagram of an example network monitoring system that utilizes an automated security policy analysis and validation tool in accordance with an embodiment.

FIG. 7 is a block diagram of an example network monitoring system 700 that utilizes the aforementioned security policy analysis and validation tool. As shown in FIG. 7, network monitoring system 700 includes a plurality of devices $702_1$-$702_N$ and $704_1$-$704_M$, a plurality of monitoring nodes $706_1$-$706_P$, an analysis server 708 and a user interface 710. Each of these components will now be further described.

Devices $702_1$-$702_N$ and devices $704_1$-$704_M$ are intended to represent devices in a network, each of which is capable of maintaining and enforcing a security policy. For example, such devices may comprise routers, firewalls, hypervisor packet filters, top-of-rack switches, or the like, although these examples are not intended to be limiting. There may be any number of these devices in network monitoring system 700. In an embodiment in which network monitoring system 700 is used to monitor devices in a large data center, there may be hundreds or even thousands of such devices.

Each of devices $702_1$-$702_N$ and devices $704_1$-$704_M$ is provisioned with and enforces a security policy. The security policy may comprise, for example, a set of rules used for filtering IP packets. Enforcement of the security policy may entail inspecting header information of IP packets and then applying a set of rules associated with the policy to such header information to determine whether the packets may be passed. Examples of security policies include router ACLs, hypervisor packet filter rules, and the like, although these examples are not intended to be limiting.

Monitoring nodes $706_1$-$706_P$ are devices or processes that operate to collect copies of security policies that are currently implemented by network devices and to pass such security policy information to analysis server 708. A single monitoring node may be configured to obtain security policy information from multiple devices. Thus, for example, as shown in FIG. 7, monitoring node $706_1$ operates to obtain a copy of a currently-implemented security policy from each of devices $702_1$-$702_N$ and monitoring node $706_P$ operates to obtain a copy of a currently-implemented security policy from each of devices $704_1$-$704_M$. Of course, it is possible that a single monitoring node may be configured to obtain security policy information from only a single device.

Although only two monitoring nodes are shown in FIG. 7, it is to be understood that system 700 may include any number of monitoring nodes, each of which may be configured to collect security policy information from any number of network devices and to pass such security policy information to analysis server. Collecting security policy information from a device may comprise querying the device for its security policy information.

In one embodiment, each device's security policy is defined as a set of configuration information. Such configuration information may be stored, for example, in a configuration file. In accordance with such an embodiment, monitoring nodes $706_1$-$706_P$ may operate to collect copies of configuration files stored by devices $702_1$-$702_N$ and devices $704_1$-$704_M$ and to provide such files to analysis server 708.

Monitoring nodes $706_1$-$706_P$ may be configured to automatically retrieve security policy information from devices $702_1$-$702_N$ and $704_1$-$704_M$ on a regular basis to support periodic analysis and reporting concerning the security policies implemented by such devices. For example, in one embodiment, monitoring nodes $706_1$-$706_M$ may be configured to automatically retrieve security policy information from devices $702_1$-$702_N$ and $704_1$-$704_M$ every day, every hour, every half-hour, or the like. Additionally or alternatively, monitoring nodes $706_1$-$706_P$ may be configured to retrieve security policy information from devices $702_1$-$702_N$ and $704_1$-$704_M$ on demand, such as in response to a request issued by an authorized party such as a system administrator or network engineer.

Security policies retrieved by monitoring nodes $706_1$-$706_P$ are stored in a policies data store 712. One or more contracts are stored in a contracts data store 714. As previously described, a contract refers to a property that should be preserved by a security policy. A contract may describe, for example, a set of traffic patterns that should be allowed or denied by a security policy. Two example contracts were previously described in reference to FIG. 4. Contracts stored in contracts data store 714 may be created by data center personnel (e.g., system administrators, network engineers or the like) or other parties via a suitable user interface (e.g., user interface 710).

In a contract validation mode of operation, analysis server 708 operates to compare polices collected by monitoring nodes $706_1$-$706_P$ (and stored in policies data store 712) to contracts stored in contracts data store 714. To compare a particular policy to a particular contract, the policy is passed from policies data store 712 to compiler 716. Compiler 716 operates to encode the policy as a predicate expressed in bit-vector logic. To perform this function, compiler includes a parser 722 that is configured to parse the policy and to extract therefrom the information required to generate the predicate expressed in bit-vector logic. Compiler 716 may be capable of invoking different parsers to handle different policy formats. For example, compiler 716 may include one parser for parsing policies that are represented in a comma separated value (CSV) format and other parsers for parsing policies that are represented in other formats. The different formats may include, for example and without limitation, vendor-specific formats such as formats used with products and/or services offered by Cisco Systems, Inc. of San Jose, Calif., and formats used with products and/or services offered by Juniper Networks, Inc. of Sunnyvale, Calif.

In a like manner, the particular contract to be compared is passed from contracts data store 714 to compiler 716 and compiler 716 operates to encode the contract to produce a bit-vector logic representation thereof. Compiler 716 then combines the bit-vector logic representations of the policy and contract to generate a bit-vector formula which is passed to security policy analysis and validation tool 718. Tool 718 uses symbolic solving of bit-vector logic to identify solutions to the bit-vector formula, thereby generating results 720 in the manner previously described in Section III.A.1. Results 720 indicate whether the contract is preserved by the policy. Results 720 may be stored and also presented to a user via a suitable user interface (e.g., user interface 710). The results may be presented, for example, in the form of report.

Analysis server 708 may also be configured to compare policies associated with two different devices or two versions of a policy from the same device using the techniques described above in Section III.A.2 and to generate results 720 of such comparison for presentation to a user.

User interface 710 is intended to generally represent any interface by which a user may interact with analysis server 708. As noted above, user interface 710 may be used to view results 720 generated by security policy analysis and validation tool 718. User interface 710 may also be used to configure various operational aspects of analysis server 708, including but not limited to defining contracts, selecting which policies should be compared to which contracts (e.g., the policies associated with certain device classes may need to conform to different contracts), specifying policies that should be compared to each other, specifying other queries about policies, specifying a frequency with which to collect and analyze policies, and the like.

Although only a single analysis server 708 is shown in FIG. 7, it is possible that a data center may include any number of analysis servers. In an implementation that includes a plurality of analysis servers, the results generated by such servers may be collected and presented to a user in a combined form.

Figure 8:
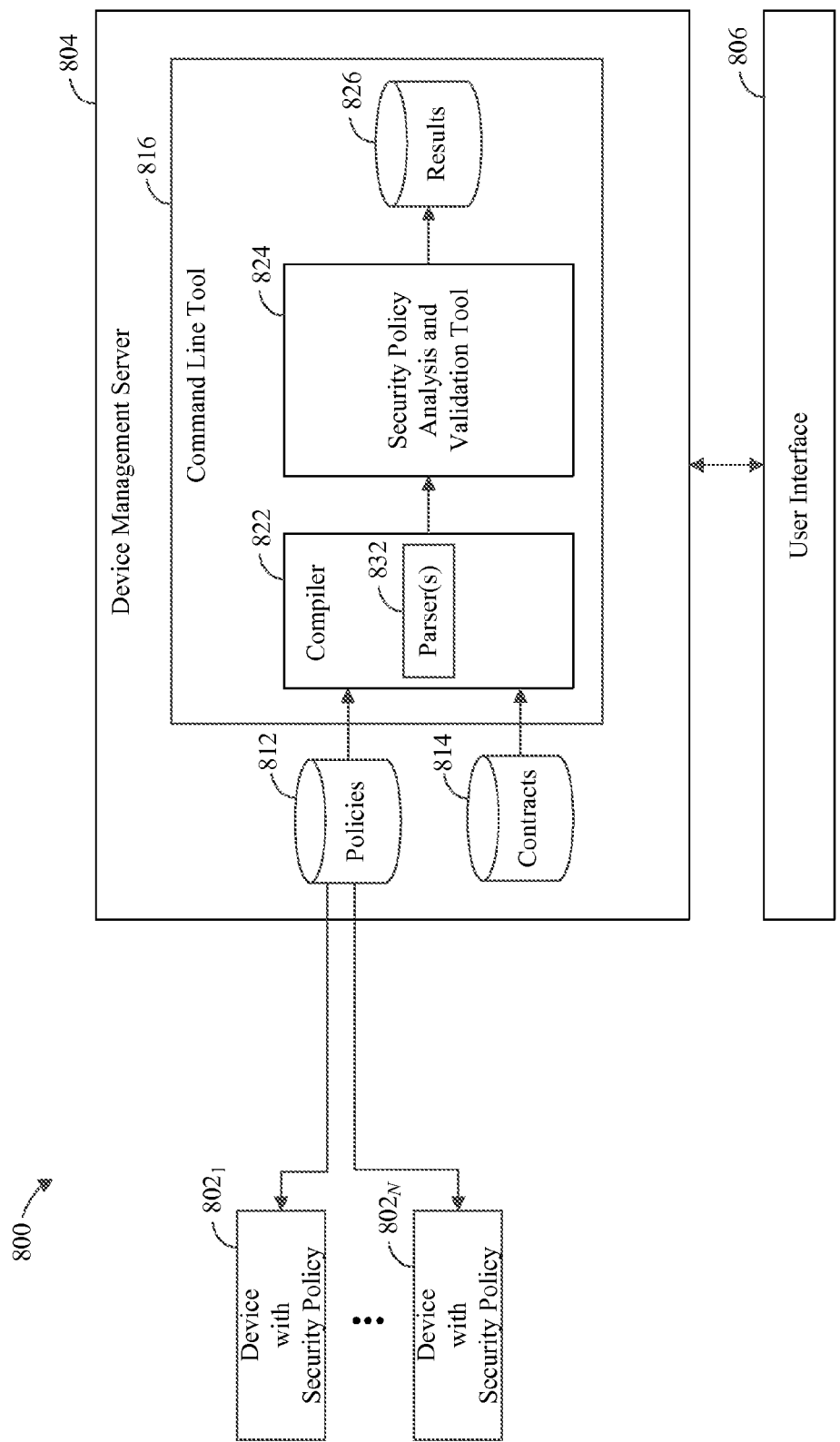
FIG. 8 is a block diagram of an example device management system that utilizes an automated security policy analysis and validation tool in accordance with an embodiment.

FIG. 8 is a block diagram of a device management system 800 that also utilizes the aforementioned security policy analysis and validation tool. As shown in FIG. 8, device management system includes a plurality of devices $802_1$-$802_N$, a device management server 804, and a user interface 806. Each of these components will now be further described.

Devices $802_1$-$802_N$ are intended to represent devices in a network, each of which is capable of maintaining and enforcing a security policy. For example, such devices may comprise routers, firewalls, hypervisor packet filters, top-of-rack switches, or the like, although these examples are not intended to be limiting. There may be any number of these devices in device management system 800.

Each of devices $802_1$-$802_N$ is provisioned with and enforces a security policy. The security policy may comprise, for example, a set of rules used for filtering IP packets. Enforcement of the security policy may entail inspecting header information of IP packets and then applying a set of rules associated with the policy to such header information to determine whether the packets may be passed. Examples of security policies include router ACLs, hypervisor packet filter rules, and the like, although these examples are not intended to be limiting.

Device management server 804 enables a user thereof to provision or deploy security policies to devices $802_1$-$802_N$. Device management server 804 also includes a command line tool 816 that enables a user thereof to perform regression testing to verify the correctness and/or determine the impact of a security policy he/she is deploying prior to deploying it. Policies to be deployed may be stored in a policies data store 812 and contracts used for validating such policies may be stored in a contracts data store 814. Although only a single device management server 804 is shown in FIG. 8, it is possible that a data center may include any number of device management servers.

In a contract validation mode of operation, command line tool 816 operates to compare polices to be deployed (and stored in policies data store 812) to contracts stored in contracts data store 814. To compare a particular policy to a particular contract, the policy is passed from policies data store 812 to a compiler 822. Compiler 822 operates to encode the policy as a predicate expressed in bit-vector logic. To perform this function, compiler includes a parser 832 that is configured to parse the policy and to extract therefrom the information required to generate the predicate expressed in bit-vector logic. Compiler 822 may be capable of invoking different parsers to handle different policy formats. For example, compiler 822 may include one parser for parsing policies that are represented in a CSV format and other parsers for parsing policies that are represented in other formats.

In a like manner, the particular contract to be compared is passed from contracts data store 814 to compiler 822 and compiler 822 operates to encode the contract to produce a bit-vector logic representation thereof. Compiler 822 then combines the bit-vector logic representations of the policy and contract to generate a bit-vector formula which is passed to a security policy analysis and validation tool 824. Tool 824 uses symbolic solving of bit-vector logic to identify solutions to the bit-vector formula, thereby generating results 826 in the manner previously described in Section III.A.1. Results 826 indicate whether the contract is preserved by the policy. Results 826 may be stored and also presented to a user via a suitable user interface (e.g., user interface 806). The results may be presented, for example, in the form of report.

Command line tool 816 may also be configured to compare policies associated with two different devices or two versions of a policy from the same device using the techniques described above in Section III.A.2 and to generate results 826 of such comparison for presentation to a user.

User interface 806 is intended to generally represent any interface by which a user may interact with device management server 804. As noted above, user interface 806 may be used to view results 826 generated by command line tool 816. User interface 806 may also be used to perform other operations, such as creating and editing security policies and contracts, deploying security policies to devices $802_1$-$802_N$, invoking command line tool 816, specifying which policies should be compared with which contracts, specifying policies that should be compared to each other, specifying other queries about policies, and the like.

IV. Encoding of Policies as Bit-Vector Logic

In this section, the manner in which policies are directly encoded as predicates expressed in bit-vector logic is described. The processes described in this section may be performed, for example, by security analysis and validation tool 502 as described above in reference to FIGS. 5 and 6, by compiler 716 as described above in reference to system 700 of FIG. 7, or by compiler 822 as described above in reference to system 800 of FIG. 8.

A. Policies as Predicates

Bit-vectors are convenient for encoding IP headers. An IPv4 address is a 32 bit number and ports are 16 bit numbers. Protocols are also numerals using 16 bits. One can therefore describe each filter as a predicate with parameters that range over bit-vectors (32-bit, or 16-bit numerals). For example, row 1 ($r_1$) and row 5 ($r_e$) from FIG. 3 have associated predicates:

$$r_1: (10.20.0.0 \leq srcIp < 10.20.31.255)$$
$$\land (157.55.252.0 \leq dstIp \leq 157.55.252.255) \land protocol=6$$

$$r_5: (65.52.244.0 \leq dstIp \leq 65.52.247.255) \land protocol=4$$

The term $r_i(\vec{x})$ is used to refer to the predicate associated with the i'th rule in a policy. The tuple $\vec{x}$ is a more succinct version of (srcIp, srcPort, dstIp, dstPort, protocol). The term r.status is used to access the status field of a rule. It is either Allow or Deny.

The meaning of a policy P is defined as a predicate $P(\vec{x})$ that evaluates to true precisely in the cases where a packet with header $\vec{x}$ is allowed to pass through. Policies are given different semantics depending on where they are used. Hypervisor packet filters use a Deny Overrides convention. Router firewalls use a First Applicable convention. The semantics of policies according to these two conventions will now be summarized.

DEFINITION 1 (DENY OVERRIDES POLICIES). Let Allow={r∈P|r.status=Allow) and likewise the Deny Overrides convention is the formula (linear in the size of the policy):

$$P(\vec{x}) = \left( \bigvee_{r \in Allow} r(\vec{x}) \right) \land \left( \bigwedge_{r \in Deny} \neg r(\vec{x}) \right)$$

Thus, a packet is admitted if some Allow rule applies and none of the Deny rules apply.

Router firewall policies use the first applicable rule. Suppose a firewall has rules $r_1, \ldots, r_n$ that are either Allow or Deny rules, then the meaning is defined (linear in the size of the policy) by induction on n:

DEFINITION 2 (FIRST APPLICABLE POLICIES). Define P, $P_i$ (for $0 \le i < n$) and $P_n$ as:

$$P(\vec{x}) = P_1(\vec{x})$$

$$P_i(\vec{x}) = r_i(\vec{x}) \vee P_{i+1}(\vec{x}) \text{ if } r_i.\text{status=Allow}$$

$$P_i(\vec{x}) = \neg r_i(\vec{x}) \wedge P_{i+1}(\vec{x}) \text{ if } r_i.\text{status=Deny}$$

$$P_n(\vec{x}) = \text{false}$$

B. Solving Bit-Vector Logic Formulas

It was shown above how policies correspond to predicates over bit-vectors. Both policies using the Deny Overrides and the First Applicable semantics correspond to logical formulas. The predicates treat the parameters as bit-vectors and use comparison (less than, greater than, equals) operations on the bit-vectors as unsigned numbers. Modern SMT solvers contain efficient decision procedures for bit-vector logic. Bit-victor logic is expressive: it captures the operations that are common on machine represented fixed-precision integers, such as modular addition, subtraction, multiplication, bit-wise logical operations, and comparisons. The solvers leverage pre-processing simplifications at the level of bit-vectors and most solvers reduce formulas to propositional satisfiability where state-of-the-art satisfiability (SAT) solving engines are used. A direct encoding into bit-vector logic that is loss-less was previously illustrated. The algorithms for solving bit-vector formulas is opaque. In the worst case, the underlying SMT solver could use an algorithm that is asymptotically much worse than algorithms that have been specifically tuned to policy analysis. However, the approach described herein easily scales an order of magnitude beyond what is required for modern data centers.

C. Leveraging SMT Solver Features

Encoding into bit-vector logic is flexible and high-level, but modern SMT solvers also provide features that are instrumental in solving problems efficiently. To give an example, one problem is to determine whether policies contain redundant rules. A direct solution using the approach described herein is to translate the original policy to a formula P and for each rule translate a policy without that rule into a formula P' and check for equivalence. The number of independent equivalence checks is linear in the number of rules. A more refined approach that leverages incrementality supported by the Z3 SMT solver works by translating P into a formula P' where each Allow rule $r_i(\vec{x})$ formula is replaced by the strengthened formula $p_i \wedge r_i(\vec{x})$, and each Deny rule $r_j(\vec{x})$ is weakened to $p_j \vee r_j(\vec{x})$ where $p_i$, $p_j$ are fresh predicates. The formula P≢P' is then asserted. If one wants to check if the rule Allow rule $r_k$ is redundant, then one checks if the resulting state is satisfiable under the assumptions $\neg p_k \wedge (\wedge_{p_i \in \text{Allow} \setminus \{p_k\}} p_i) \wedge (\wedge_{p_j \in \text{Deny}} p_j')$. The formula P≢P' is asserted only once; and the underlying engine ensures that only state that depends on the changed assumptions has to be updated between rounds. It has been observed that the incremental version is more than twenty times faster for policies with a few hundred rules.

D. Complexity

Checking difference of two Deny Overrides firewall policies is NP hard if the number of columns is unbounded: Given a clause $C_i$:$x \vee \neg \sqrt{y} \vee u$ one can associate the rule $r_i$:$x \in [0:0] \wedge y \in [1:1] \wedge z \in [0:1] \wedge u \in [0:0]$, so a set of clauses $C_1 \wedge \ldots \wedge C_n$ is satisfiable if the following policies $P_1$:$x \in [0:0] \wedge y \in [1:1] \wedge z \in [0:1] \wedge u \in [0:0]$ and $P_2$: $r_1, \ldots, r_n$ (of allow rules) are different. The number of columns in firewalls is fixed, and several data structures and related polynomial time algorithms are known. The approach described herein with encoding into bit-vector logic side-steps concerns about devising domain specific efficient algorithms. Compilation into bit-vector formulas is linear and embodiments described herein admit arbitrary queries that can be expressed over bit-vector logic.

V. Algorithms for Enumerating Differences Between Policies

Various algorithms will now be described that can be used to enumerate solutions to combinations of logical formulas corresponding to bit-vectors. Each of these algorithms may be implemented by a security policy analysis and validation tool to enumerate differences between two policies or between a policy and a contract. For example, each of these algorithms may be implemented by security policy analysis and validation tool 502 as described above in reference to FIGS. 5 and 6, security policy analysis and validation tool 718 as described above in reference to FIG. 7, and security policy analysis and validation tool 824 as described above in reference to FIG. 8.

Given two policies $P_1(\vec{x})$ and $P_2(\vec{x})$, what is their difference? One can of course characterize the differences as $P_1(\vec{x}) \wedge \neg P_2(\vec{x})$ and $\neg P_1(\vec{x}) \wedge P_2(\vec{x})$, but this says little to a system administrator about which packets are allowed by one and not the other. What is needed is a succinct way to enumerate packets that belong to the differences. For this purpose, three increasingly more sophisticated algorithms were developed for enumerating such packets in progressively more compact form. The algorithms work on arbitrary bit-vector formulas. In the following, the term $\phi[\vec{x}]$ will be used for an arbitrary bit-vector formula with free variables $\vec{x}$.

The first algorithm is Algorithm All-SAT provided in Algorithm 1. It is based on enumerating all satisfiable values for a formula $\phi$ in a straight-forward way. It is the default solution to the All-SAT problem when used with modern SAT solvers. The second, Algorithm All-BVSAT in Algorithm 2, enumerates cubes of values that satisfy $\phi$. A cube is a cross-product of intervals. This representation corresponds closely to how firewall rules are represented in policies. The third, Algorithm All-BVSAT★ in Algorithm 4, generalizes enumeration of cubes to multi-cubes. A multi-cube is a cross product of sets of intervals. Both cubes and multi-cubes provide readable ways to inspect properties of security policies. Multi-cubes may, however, provide an exponentially more succinct representation of differences than cubes. It is also easy to read off the number of values that satisfy a cube (and a multi-cube): it is the product of values in each interval (set). Besides being useful for analyzing firewall policies, the algorithms described herein can also be used in general for counting the number of solutions to a formula. This problem is also known as #SAT. The use of multi-cubes is a particularly good fit for firewall policies due to the way policies are normally specified over address ranges.

A. All-SAT

Algorithm 1 contains a straight-forward All-SAT algorithm. It queries a given formula B in a loop. It adds a disjunction of new disequalities to B in every loop iteration (here represented as a single disequality between a vector of values and a vector of variables). SAT and SMT solvers support incrementally adding constraints, so that in each iteration only the new disequality needs to be added to the state of the solver. Don't cares in a satisfying assignment also can be found efficiently and dropped, resulting in stronger constraints and fewer iterations of the main loop. In spite of support for adding constraints incrementally, basic All-SAT enumeration suffers in practice from degraded performance as the set of disequalities grows. The enumeration obtained from an All-SAT loop may also be overly verbose. The next method addresses this limitation.

---
Algorithm 1: ALL-SAT
---

Input: Formula $\phi[\vec{x}]$
Output: values $\vec{v}_1, \vec{v}_2, \ldots, \vec{v}_k$, s. t.
$\phi \equiv \vec{x} = \vec{v}_1 \lor \vec{x} = \vec{v}_2 \lor \ldots \vec{x} = \vec{v}_k$
$B \leftarrow \phi$;
$k \leftarrow 0$;
while B is satisfiable do
    $k \leftarrow k + 1$;
    $\vec{v}_k \leftarrow$ a satisfying assignment to B;
    $B \leftarrow B \land (\vec{x} \neq \vec{v}_k)$;
end
return $\vec{v}_1, \vec{v}_2, \ldots, \vec{v}_k$ ---
Algorithm 2: ALL-BVSAT
---

Input: Formula $\phi[\vec{x}]$
Output: sets $\vec{S}_1, \vec{S}_2, \ldots, \vec{S}_k$, s. t.
$\phi \equiv \vec{x} \in \vec{S}_1 \lor; \vec{x} \in \vec{S}_2 \lor \ldots \vec{x} \in \vec{S}_k$
$B \leftarrow \phi$;
$k \leftarrow 0$;
while B is satisfiable do
    $k \leftarrow k + 1$;
    $\vec{v}_k \leftarrow$ a satisfying assignment to B;
    $\vec{S}_k \leftarrow \{v_1\} \times \ldots \times \{v_{|\vec{v}|}\}$;
    foreach index $i = 1 \ldots |\vec{v}|$ do
        $\vec{S}_k \leftarrow$ Min-BVSAT$(\phi, \vec{S}_k, i)$;
        $\vec{S}_k \leftarrow$ Max-BVSAT$(\phi, \vec{S}_k, i)$;
    end
    $B \leftarrow B \land (\vec{x} \notin \vec{S}_k)$;
end
return $\vec{S}_1, \vec{S}_2, \ldots, \vec{S}_k$

B. All-BVSAT Using Cubes

Enumerating one solution at a time is unsatisfactory when many solutions can be represented succinctly using cubes. The idea of enumerating solutions as cubes will now be illustrated as an example. In the following, the query and values are kept abstract to retain the generality of the algorithm.

1. Find initial $ip_0$, $port_0$, such that $(ip_0=ip) \land (port_0=port) \Rightarrow \phi$.
2. Maximize interval $[lo_{ip}, hi_{ip}]$, such that $ip_0 \in [lo_{ip}, hi_{ip}]$ and $lo_{ip} \le ip \le hi_{ip} \land (port_0=port) \land \neg \phi$ is unsatisfiable.
3. Maximize next interval $[lo_{port}, hi_{port}]$, such that $port_0 \in [lo_{port}, hi_{port}]$ and $lo_{ip} \le ip \le hi_{ip} \land lo_{port} \le port \le hi_{port} \land \neg \phi$ is unsatisfiable.
4. Produce the set of intervals $[lo_{ip}, hi_{ip}] \times [lo_{port}, hi_{port}]$. All pairs of values in these two intervals satisfy $\phi$.
5. Update the query to $\phi := \phi \land \neg(lo_{ip} \le ip \le hi_{ip} \land lo_{port} \le port \le hi_{port})$ and repeat the loop.

The walk-through assumed there was some way to maximize intervals efficiently. An algorithm for maximizing intervals is provided in Algorithm 3. Some notation is relied on for describing the algorithms.

The term S is used to range over sets of bit-vector values of a given size. The representation that will be convenient for the sets S is as a union of intervals. So for example $S := [0 \ldots 3] \cup [6 \ldots 7]$ is a set with the values $\{0, 1, 2, 3,$ 6, 7$\}$ The predicate $x \in S$ expands to a disjunction $lo_1 \le x \le hi_1 \lor \ldots \lor lo_n \le x \le hi_n$, where $S = [lo_1 \ldots hi_1] \cup \ldots \cup [lo_n \ldots hi_n]$. The predicate T is true on all values (bit-vectors). It also is used to represent the set that contains all bit-vector values for a given length, so $x \in T$ expands to true. When S is a non-empty set then min S is the minimal element in S. $\vec{S}$ is a cross-product of sets $S_1 \times \ldots \times S_n$. $\vec{S}[i \mapsto S]$ is the product $S_1 \times \ldots \times S_{i-1} \times S \times S_{i+1} \times \ldots S_n$; in other words, it is the product $\vec{S}$ with the ith set replaced by S. The predicate $\vec{x} \in \vec{S}$ is short for $\bigwedge_{i=1}^{|\vec{x}|} x_i \in S_i$.

Algorithm 2 enumerates all solutions to a formula $\phi$ as cubes (products of intervals). In each iteration it selects some value $\vec{v}$ that is not yet covered by any of the existing sets. It then widens the value $\vec{v}$ as much as possible to intervals.

It relies on a procedure Min-BVSAT and a symmetric variant Max-BVSAT for extending a satisfying interval maximally down and up. Algorithm 3 provides an implementation of Min-BVSAT. It first checks if there is an evaluation to the parameters $\vec{x}$ such that the value of $x_i$ is below min $S_i$ and that satisfies $\neg \phi$. As long as it is the case, it checks if there is a value still below min $S_i$, but above the previous value. This process ensures that the post-condition is established: that all values in $\vec{S}[i \mapsto S_{lo}]$ satisfy $\phi$ and that $S_{lo}$ is extended maximally downwards with values that maintain $\phi$. By induction on i, this implies that the resulting cube $\vec{S}_k$ is maximum: it is not possible to extend any of the faces without losing the property of satisfying $\phi$.

The proposed implementation uses linear search, where the bound on the number of loop iterations is given by the size of the domain of $x_i$. If $x_i$ is a 32-bit bit-vector then the potential number of iterations is in the order of $2^{32}$. Nevertheless, when profiling these algorithms in the context of All-BVSAT for production policies, it was found that they converged in average within ten steps for each cube. Nevertheless, a binary search based implementation of these procedures was used for All-BVSAT★. Binary search is asymptotically much more efficient (linear in the number of bits instead of exponential). It was observed that the average number of steps required was five.

---
Algorithm 3: Min-BVSAT. Extend $S_i$ downwards.
---

Input: Formula $\phi[\vec{x}]$, sets $\vec{S}$ s.t. for every $\vec{v} \in \vec{S}$, $\phi[\vec{v}]$, and index i into $\vec{S}$.
Output: $\vec{S}[i \mapsto S_{lo}]$, such that $S_{lo} \supseteq S_i$, and for every $\vec{v} \in \vec{S}[i \mapsto S_{lo}]$, $\phi[\vec{v}]$. If
    min $S_{lo} > 0$, then there is some value $\vec{w} \in \vec{S}[i \mapsto \{\text{min } S_{lo} - 1\}]$, such that
$\phi[\vec{w}]$ is false.
$\vec{S}' \leftarrow \vec{S}[i \mapsto T]$;
$l \leftarrow$ min $S_i$;
$B \leftarrow \neg \phi \land \vec{x} \in \vec{S}' \land x_i < l$;
while B is satisfiable do
    $l \leftarrow$ the satisfying assignment to $x_i$;
    $B \leftarrow B \land l \land x_i$;
end
return $\vec{S}[i \mapsto S_i \cup [l + 1 \ldots \text{min } S_i]]$

C. All-BVSAT Using Multi-cubes

In some cases, using multi-cubes can achieve performance that is exponentially better than that achieved by enumerating cubes. Using multi-cubes means that instead of enumerating product of intervals, products of sets of intervals are enumerted. Policy rules may contain multi-cubes with up to four ranges corresponding to both source and destination addresses and ports. Multi-cubes can be much more succinct than cubes, for example the set $$\underbrace{([0 \ldots 3] \cup [6 \ldots 7] \times \ldots \times ([0 \ldots 3] \cup [6 \ldots 7])}_{N \text{ TIMES}}$$

requires $2^N$ cubes to represent. The algorithm that we will describe next requires at most N multi-cubes to reconstruct the above set.

The idea behind the algorithm can be explained as follows. The algorithm extends All-BVSAT by trying to insert new values into previous cubes (that then become multi-cubes). It first relies on finding some value $\vec{w}$ that has not yet been included in any of the existing multi-cubes. Then, for each multi-cube $S_j$ and each index i into $\vec{w}$; it determines whether $\vec{S}_j$ can be extended by using $w_i$ and the existing sets of values from $\vec{S}_j$ in positions different from i. So it checks whether the vector $\vec{S}'$, where $\vec{S}'$ is obtained from $\vec{S}_j$ by replacing the i'th set by $\{w_i\}$, implies $\phi$ (or equivalently, has an empty intersection with $\neg \phi$). If it does, then the algorithms for extending $\vec{S}'$ at the i'th index can be applied.

It is noted that the algorithm may not find the smallest multi-cube representation of the satisfying assignments to $\phi$, but it finds one within a polynomial overhead. To see this, let $\vec{S}_1, \ldots, \vec{S}_k$ be an arbitrary decomposition into multi-cubes. Without loss of generality consider $\vec{S}_1$ and suppose it has up to n intervals in each dimension. There are up to n covers of the set of disjoint intervals. For each such cube it takes at most $\Sigma_i |\vec{S}_{1i}|$ (where $\vec{S}_{1i}$ is the number of intervals in the ith coordinate of $\vec{S}_1$) iterations to cover all other cubes in $\vec{S}_1$.

---

Algorithm 4: ALL-BVSAT★

Input: Formula $\phi[\vec{x}]$
Output: Sets $\vec{S}_1, \vec{S}_2, \ldots, \vec{S}_k$, s. t.
$\phi \equiv \vec{x} \in \vec{S}_1 \vee \vec{x} \in \vec{S}_2 \vee \ldots \vec{x} \in \vec{S}_k$
B ← $\phi$;
k ← 0;
while B is satisfiable do
    $\vec{v}$ ← a satisfying assignment to B;
    foreach index j = 1 ... k do
        $\vec{S}_j$ ← Extend($\vec{S}_j, \vec{v}$);
        B ← B ∧ ($\vec{x} \notin \vec{S}_j$);
    end
    if $\phi \wedge B \wedge \vec{x} = \vec{v}$ is still satisfiable then
        k ← k + 1;
        $\vec{S}_k$ ← $\{v_1\} \times \ldots \times \{v_{|\vec{v}|}\}$;
        foreach index i = 1 ... $|\vec{v}|$ do
            $\vec{S}_k$ ← Min-BVSAT($\phi, \vec{S}_k$, i);
            $\vec{S}_k$ ← Max-BVSAT($\phi, \vec{S}_k$, i);
        end
        B ← B ∧ ($\vec{x} \notin \vec{S}_k$);
    end
end
return $\vec{S}_1, \vec{S}_2, \ldots, \vec{S}_k$

---

Algorithm 5: Extend. Extend set assignment

Input: Set $\vec{S}$ and formula $\phi$ such that $\phi[\vec{v}]$ for every $\vec{v} \in \vec{S}$. A vector
    $\vec{w}$, such that $\vec{w} \notin \vec{S}$ and $\vec{w}$ satisfies $\phi$
foreach index i = 1 ... $|\vec{w}|$ do
    $\vec{S}'$ ← $\vec{S}[i \mapsto \{w_i\}]$;
    if $\neg \phi \wedge (\vec{x} \in \vec{S}')$ is unsatisfiable, and $w_i \notin S_i$ then
        $\vec{S}'$ ← Min-BVSAT($\phi, \vec{S}'$, i);
        $\vec{S}'$ ← Max-BVSAT($\phi, \vec{S}'$, i);
        $\vec{S}$ ← $\vec{S}[i \mapsto S_i \cup S_i']$;
    end
end
return $\vec{S}$;

---

VI. Example Methods of Operation

This section describes various methods that may be implemented by an automated security policy analysis and validation system as described herein.

Figure 9:
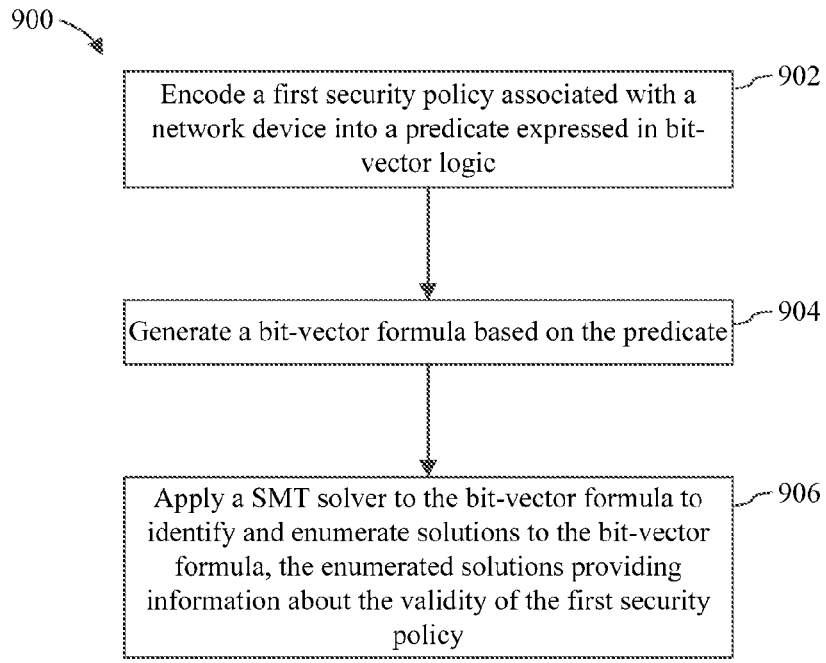
FIG. 9 depicts a flowchart of a method for analyzing and validating network security policies in accordance with an embodiment.

For example, FIG. 9 depicts a flowchart 900 of a method for analyzing and validating network security policies in accordance with an embodiment. The method of flowchart 900 may be performed, for example, by security policy analysis and validation tool 502 as described above in reference to FIGS. 5 and 6, by analysis server 708 as described above in reference to FIG. 7, or by command line tool 816 as described above in reference to FIG. 8.

As shown in FIG. 9, the method of flowchart 900 begins at step 902, in which a first security policy associated with a network device is encoded into a predicate expressed in bit-vector logic. This step may be performed, for example, by a compiler such as compiler 716 of FIG. 7 or compiler 822 of FIG. 8. The network device may comprise, for example, one of a firewall, a router, a hypervisor packet filter, or a switch. The first security policy may comprise a set of rules that filter IP packets. Furthermore, the security policy may be specified in one of a deny overrides convention or a first applicable convention.

At step 904, a bit-vector formula is generated based on the predicate. This step may also be performed, for example, by a compiler such as compiler 716 of FIG. 7 or compiler 822 of FIG. 8.

At step 906, a SMT solver is applied to the bit-vector formula to identify and enumerate solutions to the bit-vector formula, wherein the enumerated solutions provide information about the validity of the first security policy. This step may be performed, for example, by a security policy analysis and validation tool, such as any of security policy analysis and validation tool 502 of FIGS. 5 and 6, security policy analysis and validation tool 718 of FIG. 7, or security policy analysis and validation tool 824 of FIG. 8.

In one embodiment, step 904 comprises generating the bit-vector formula by combining the predicate with another predicate that represents a second security policy. This corresponds to the operating mode shown in FIG. 6 (i.e., change impact analysis mode). In accordance with such an embodiment, the solutions to the bit-vector formula that are identified and enumerated in step 906 represent differences between the first security policy and the second security policy.

In another embodiment, step 904 comprises generating the bit-vector formula by combining the predicate with a bit-vector representation of a contract, wherein the contract describes a set of traffic patterns that should be allowed or denied by the first security policy. This corresponds to the operating mode shown in FIG. 5 (i.e., contract validation mode). In accordance with such an embodiment, the solutions to the bit-vector formula indicate whether the contract is preserved by the first security policy.

The method of claim 900 may further include obtaining security policies from network devices, including the first security policy associated with the network device. This collecting of security policies may be performed on demand or automatically on a regular or irregular basis. In an embodiment, this additional step may be performed by any of monitoring nodes $706_1$-$706_P$ as described above in reference to FIG. 7.

In one embodiment, the first security policy comprises a configuration file. In accordance with such an embodiment, the method of claim 900 may further comprise parsing the configuration file to extract information therefrom that is used to encode the first security profile in step 902. This step may be performed, for example, by parser 722 as described above in reference to FIG. 7 or parser 832 as described above in reference to FIG. 8.

In an embodiment, the identification of solutions to the bit-vector formula that takes place in step 906 may comprise identifying tuples that satisfy the bit-vector formula. Each tuple may include one or more of a source IP address, a destination IP address, a source port, and a destination port.

In a further embodiment, the enumerating of solutions to the bit-vector formula that takes place in step 906 comprises enumerating the solutions to the bit-vector formula as cubes. As noted above, a cube represents a cross product of intervals. Alternatively, the solutions to the bit-vector formula may be enumerated as multi-cubes. As also noted above, a multi-cube represents a cross product of unions of intervals.

Figure 10:
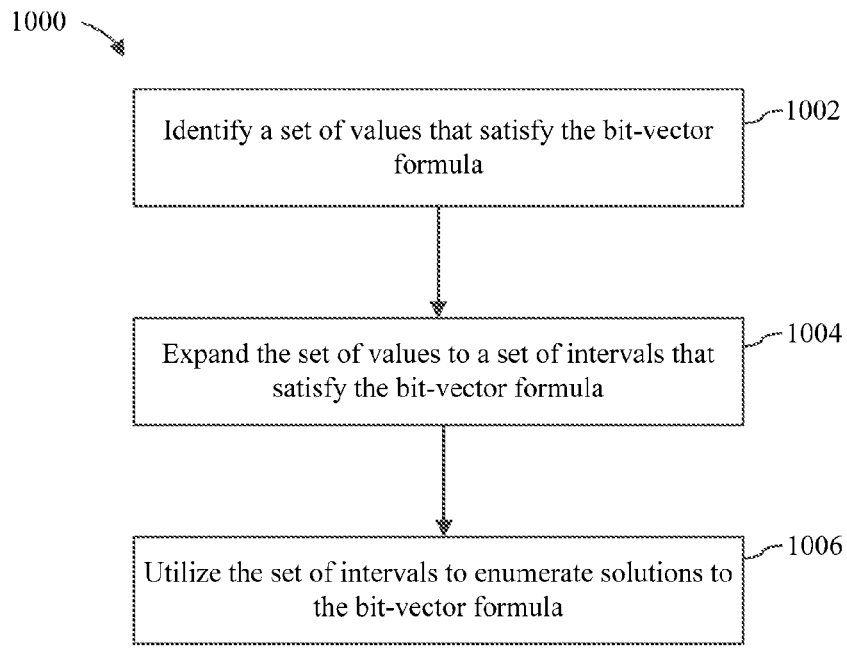
FIG. 10 depicts a flowchart of a method for compactly enumerating solutions to a bit-vector formula in accordance with an embodiment.

FIG. 10 depicts a flowchart 1000 of a method for compactly enumerating solutions to a bit-vector formula. The method of flowchart 900 may be performed, for example, by security policy analysis and validation tool 502 as described above in reference to FIGS. 5 and 6, by security policy analysis and validation tool 718 as described above in reference to FIG. 7, or by security policy analysis and validation tool 824 as described above in reference to FIG. 8.

As shown in FIG. 10, the method of flowchart 1000 begins at step 1002, in which a set of values is identified that satisfy the bit-vector formula.

At step 1004, the set of values identified in step 1002 is expanded to a set of intervals that satisfy the bit-vector formula. As described in more detail above in reference to the All-BVSAT algorithm, the expanding includes identifying, for each interval, a maximum lower bound and a maximum higher bound. The identification of the maximum lower bound includes identifying values below the maximum lower bound for which the complement of the bit-vector formula is satisfied. The identification of the maximum upper bound includes identifying values above the maximum upper bound for which the complement of the bit vector formula is satisfied.

At step 1006, the set of intervals obtained in step 1004 are utilized to enumerate solutions to the bit-vector formula. In one embodiment, this step comprises enumerating solutions to the bit-vector as a product of the intervals (i.e., as cubes). In an alternate embodiment, this step comprises inserting new values into the set of intervals, thereby generating a set of union of intervals (this insertion process is described in more detail above in reference to the All-BVSAT★ algorithm) and then enumerating solutions to the bit-vector formula as a product of the unions of intervals (i.e., as multi-cubes).

VII. Example Processor-Based System Implementation

Figure 11:
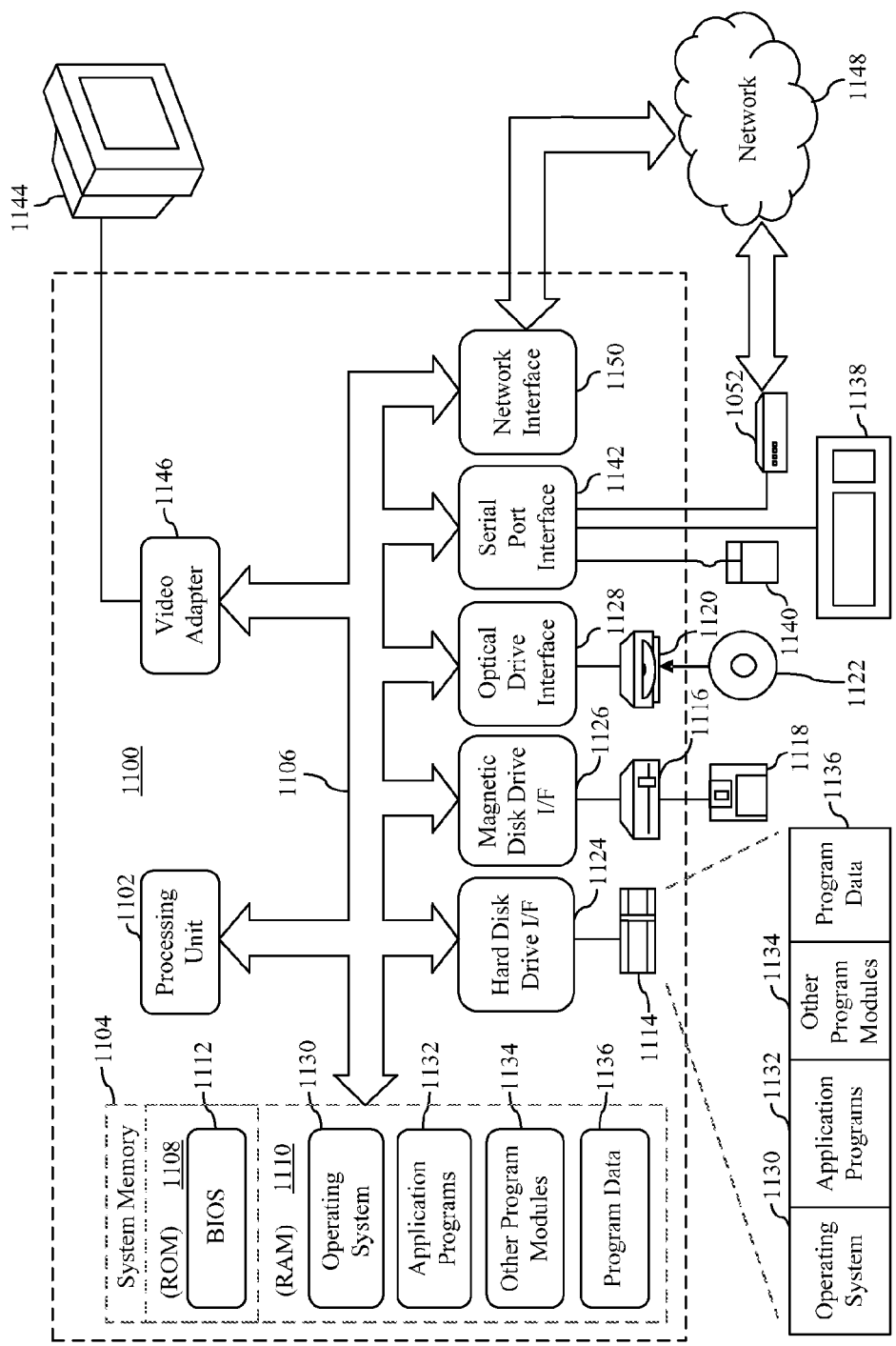
FIG. 11 is a block diagram of an example processor-based computer system that may be used to implement various embodiments.

FIG. 11 depicts an example processor-based computer system 1100 that may be used to implement various embodiments described herein. For example, system 1100 may be used to implement any of the components of system 500 as described above in reference to FIGS. 5 and 6, system 700 as described above in reference to FIG. 7, or system 800 as described above in reference to FIG. 8. System 1100 may also be used to implement any of the steps of flowchart 900 as described above in reference to FIG. 9 or flowchart 1000 as described above in reference to FIG. 10. The description of system 1100 provided herein is provided for purposes of illustration, and is not intended to be limiting. Embodiments may be implemented in further types of computer systems, as would be known to persons skilled in the relevant art(s).

As shown in FIG. 11, system 1100 includes a processing unit 1102, a system memory 1104, and a bus 1106 that couples various system components including system memory 1104 to processing unit 1102. Processing unit 1102 may comprise one or more microprocessors or microprocessor cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all of the functions and features of system 500 as described above in reference to FIG. 5, system 700 as described above in reference to FIG. 7, or system 800 as described above in reference to FIG. 8. The program modules may also include computer program logic that, when executed by processing unit 1102, performs any of the steps or operations shown or described in reference to flowchart 900 of FIG. 9 and flowchart 1000 of FIG. 10.

A user may enter commands and information into system 1100 through input devices such as a keyboard 1138 and a pointing device 1140. Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). Such interfaces may be wired or wireless interfaces.

A display 1144 is also connected to bus 1106 via an interface, such as a video adapter 1146. In addition to display 1144, system 1100 may include other peripheral output devices (not shown) such as speakers and printers.

System 1100 is connected to a network 1148 (e.g., a local area network or wide area network such as the Internet) through a network interface or adapter 1150, a modem 1152, or other suitable means for establishing communications over the network. Modem 1152, which may be internal or external, is connected to bus 1106 via serial port interface 1142.

As used herein, the terms "computer program medium," "computer-readable medium," and "computer-readable storage medium" are used to generally refer to storage devices or storage structures such as the hard disk associated with hard disk drive 1114, removable magnetic disk 1118, removable optical disk 1122, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable computer 1100 to implement features of embodiments of the present invention discussed herein. Accordingly, such computer programs represent controllers of the system 1100.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1100 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VIII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for analyzing and validating network security policies, comprising:
    a memory that stores computer program logic; and
    at least one processor configured to execute the computer program logic that, when executed, provides:
        a compiler that encodes a first security policy associated with a network device into a predicate expressed in bit-vector logic and generates a bit-vector formula based on the predicate; and
        a security policy analysis and validation tool that receives the bit-vector formula and applies a Satisfiability Modulo Theories (SMT) solver thereto to identify and enumerate solutions to the bit-vector formula, the enumerated solutions providing information about the validity of the first security policy, the security policy analysis and validation tool enumerating solutions to the bit-vector formula as multi-cubes, a multi-cube representing a cross product of unions of intervals.

2. The system of claim 1, wherein the compiler generates the bit-vector formula by combining the predicate with another predicate that represents a second security policy, and
    wherein the solutions to the bit-vector formula represent differences between the first security policy and the second security policy.

3. The system of claim 1, wherein the compiler generates the bit-vector formula by combining the predicate with a bit-vector logic representation of a contract, the contract describing a set of traffic patterns that should be allowed or denied by the first security policy, and
    wherein the solutions to the bit-vector formula indicate whether the contract is preserved by the first security policy.

4. The system of claim 1, further comprising:
    a monitoring node that periodically obtains security policies from network devices, including the first security policy associated with the network device.

5. The system of claim 1, wherein the first security policy comprises a configuration file, and wherein the compiler comprises a parser that is configured to extract information from the configuration file that is used to encode the first security policy into the predicate expressed in bit-vector logic.

6. The system of claim 1, wherein the network device comprises one of a firewall, a router, a hypervisor packet filter, or a switch.

7. The system of claim 1, wherein the first security policy comprises a set of rules that filter Internet Protocol (IP) packets.

8. The system of claim 7, wherein the first security policy is specified in one of a deny overrides convention or a first applicable convention.

9. The system of claim 1, wherein the security policy analysis and validation tool identifies solutions to the bit-vector formula by identifying tuples that satisfy the bit-vector formula, each tuple including one or more of a source Internet Protocol (IP) address, a destination IP address, a source port, and destination port.

10. The system of claim 2, wherein the differences between the first security policy and the second security policy include at least one semantic difference.

11. The system of claim 10, wherein the security policy analysis and validation tool is configured to provide the at least one semantic difference between the first security policy and the second security policy.

12. The system of claim 1, wherein the system comprises a command line tool.

13. A computer program product comprising a computer readable storage device having computer program logic stored thereon, the computer program logic comprising:
first computer program logic that, when executed by a processing unit, encodes a first security policy associated with a network device into a predicate expressed in bit-vector logic and generates a bit-vector formula based on the predicate;

second computer program logic that, when executed by the processing unit, applies a Satisfiability Modulo Theories (SMT) solver to the bit-vector formula to identify solutions thereto, the solutions to the bit-vector formula providing information about the validity of the first security policy; and third computer program logic that, when executed by the processing unit, enumerates the solutions to the bit-vector formulas as multi-cubes, each multi-cube representing a cross product of unions of intervals.

14. The computer program product of claim 13, wherein the first computer program logic generates the bit-vector formula by combining the predicate with another predicate that represents a second security policy, and
wherein the solutions to the bit-vector formula represent differences between the first security policy and the second security policy.

15. The computer program product of claim 13, wherein the first computer program logic generates the bit-vector formula by combining the predicate with a bit-vector logic representation of a contract, the contract describing a set of traffic patterns that should be allowed or denied by the first security policy, and
wherein the solutions to the bit-vector formula indicate whether the contract is preserved by the first security policy.

16. The computer program product of claim 13, wherein the network device comprises one of a firewall, a router, a hypervisor packet filter, or a switch.

17. The computer program product of claim 13, wherein the second computer program logic identifies solutions to the bit-vector formula by identifying tuples that satisfy the bit-vector formula, each tuple including one or more of a source Internet Protocol (IP) address, a destination IP address, a source port and a destination port.

* * * * *